(12) United States Patent
He et al.

(10) Patent No.: US 11,665,100 B2
(45) Date of Patent: May 30, 2023

(54) DATA STREAM IDENTIFICATION METHOD AND APPARATUS (71) Applicant: HUAWEI TECHNOLOGIES CO., LTD., Guangdong (CN)

(72) Inventors: Ke He, Shenzhen (CN); Zhitang Chen, Hong Kong (CN); Yunfeng Shao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 320 days.

(21) Appl. No.: 16/894,425

(22) Filed: Jun. 5, 2020

(65) Prior Publication Data

US 2020/0302216 A1    Sep. 24, 2020

Related U.S. Application Data (63) Continuation of application No. PCT/CN2018/112086, filed on Oct. 26, 2018.

(30) Foreign Application Priority Data

Dec. 8, 2017 (CN) .......................... 201711292369.4

(51) Int. Cl.
*G06T 7/00* (2017.01)
*H04L 47/2483* (2022.01)
(Continued)

(52) U.S. Cl.
CPC ......... *H04L 47/2483* (2013.01); *G06N 3/045* (2023.01); *G06T 7/33* (2017.01);
(Continued)

(58) Field of Classification Search
CPC ........ G06V 10/454; G06V 10/75; G06T 7/33; G06N 3/0454; H04L 69/22
See application file for complete search history.

(56) References Cited

U.S. PATENT DOCUMENTS

| 8,031,299 B2 | 10/2011 | Mori et al. | |
| 2015/0254555 A1* | 9/2015 | Williams, Jr. | .......... G06N 3/084 706/14 |
| 2019/0222499 A1 | 7/2019 | Chen et al. | |

FOREIGN PATENT DOCUMENTS

| CN | 102315974 A | 1/2012 |
| CN | 104184723 A | 12/2014 |

(Continued)

OTHER PUBLICATIONS

Wei Wang et al. "Malware Traffic classification using convolutional neural network for Representation Learning" IEEE Jan. 2017 Cited in the IDS. (Year: 2017).*

(Continued)

*Primary Examiner* — Sean T Motsinger
(74) *Attorney, Agent, or Firm* — Womble Bond Dickinson (US) LLP (57) ABSTRACT

This application provides a data stream identification method and apparatus and belongs to the field of Internet technologies. The method includes: obtaining packet transmission attribute information of N consecutive packets in a target data stream; generating feature images of the packet transmission attribute information of the N consecutive packets based on the packet transmission attribute information of the N consecutive packets; and inputting the feature images into a pre-trained image classification model, to obtain a target application identifier corresponding to the target data stream. According to this application, accuracy of identifying an application identifier corresponding to a data stream can be improved.

20 Claims, 4 Drawing Sheets

(51) Int. Cl.
*G06T 7/33* (2017.01)
*H04L 69/22* (2022.01)
*G06N 3/045* (2023.01)
*G06V 10/764* (2022.01)
*G06V 10/82* (2022.01)
*G06V 10/94* (2022.01)
*G06V 20/40* (2022.01)

(52) U.S. Cl.
CPC ............ *G06V 10/764* (2022.01); *G06V 10/82* (2022.01); *G06V 10/95* (2022.01); *G06V 20/46* (2022.01); *H04L 69/22* (2013.01)

(56) References Cited

FOREIGN PATENT DOCUMENTS

| | | | |
|---|---|---|---|
| CN | 105528638 A | 4/2016 | |
| CN | 105740903 A | 7/2016 | |
| CN | 105871832 A | 8/2016 | |
| CN | 106203499 A | 12/2016 | |
| CN | 106682569 A | 5/2017 | |
| CN | 107222369 A | 9/2017 | |
| KR | 20130101647 A | 9/2013 | |
| WO | 2017152883 A1 | 9/2017 | |

OTHER PUBLICATIONS

Chen et al. "Seq2Img: a sequence to image based approach words IP traffic classification using convolution neural networks" (Year: 2017).*

Chen Zhitang et al: "Seq2Img: A sequence-to-image based approach towards IP traffic classification using convolutional neural networks", 2017 IEEE International Conference On Big Data(Big Data), IEEE, Dec. 11, 2017 (Dec. 11, 2017), pp. 1271-1276, XP033298367.

Zhou Huiyi et al: "A Method of Improved CNN Traffic Classification", 2017 13th International Conference On Computational Intelligence and Security(CIS), IEEE, Dec. 15, 2017 (Dec. 15, 2017), pp. 177-181, XP033318410.

Zhou Rui et al. Feature analysis and recognition of game traffic Computer Engineering and Applications 201652(23) pp. 135-141. with English translation.

Quan Hong-bo et al. SVM Based P2P Traffic Identification Microcomputer Information Oct. 2010. pp. 105-107. with English translaiton.

Wei Wang et al. Malware Traffic Classification Using Convolutional Neural Network for Representation Learning, ICOIN 2017, pp. 712-717.

* cited by examiner

DATA STREAM IDENTIFICATION METHOD AND APPARATUS

CROSS-REFERENCE TO RELATED APPLICATIONS

This application is a continuation of International Application No. PCT/CN2018/112086, filed on Oct. 26, 2018, which claims priority to Chinese Patent Application No. 201711292369.4, filed on Dec. 8, 2017, The disclosures of the aforementioned applications are hereby incorporated by reference in their entireties.

TECHNICAL FIELD

This disclosure relates to the field of Internet technologies, and in particular, to a data stream identification method and apparatus.

BACKGROUND

With development of Internet technologies, an increasing quantity of applications may transmit data through a network, and massive data streams are transmitted all the time in the network. A server may provide different priorities to different applications, to facilitate management of the data streams in the network. Therefore, the server should identify an application identifier corresponding to a data stream.

The different applications transmit different content. Therefore, during setting of a feature library, a plurality of data streams of each application may be analyzed and summarized, to extract a feature field corresponding to each application, and then, a correspondence between a feature field and an application identifier may be stored in the feature library. When receiving a data stream, the server may match, field by field by using a deep packet inspection method, a payload field in a packet in the data stream with a feature field stored in the feature library, to find a matching feature field, and may further obtain an application identifier corresponding to the feature field, that is, identify the application identifier corresponding to the data stream.

To protect user privacy, an increasing quantity of applications encrypt a payload field in a packet in a data stream, so that the payload field is random to some extent. When parsing different payload fields of a same type of applications, the server may obtain different feature fields, and the obtained feature fields may be different from a feature field corresponding to an application identifier in a feature library. As a result, accuracy of identifying the application identifier corresponding to the data stream is relatively low.

SUMMARY

To resolve a problem in the prior art that accuracy of identifying an application identifier corresponding to a data stream is relatively low, embodiments of this application provide a data stream identification method and apparatus. The technical solutions are as follows:

According to a first aspect, a data stream identification method is provided. The method includes: obtaining packet transmission attribute information of N consecutive packets in a target data stream, where N is a positive integer greater than 1; generating feature images of the packet transmission attribute information of the N consecutive packets based on the packet transmission attribute information of the N consecutive packets; and inputting the feature images into a pre-trained image classification model, to obtain a target application identifier corresponding to the target data stream.

According to the solution in one embodiment, when receiving a target data stream, a server may obtain, through identification based on packet transmission attribute information of packets in the data stream, a target application identifier corresponding to the target data stream. Specifically, whenever starting to receive a target data stream, the server may extract packet transmission attribute information of the first N received consecutive packets, instead of directly using payload fields in the packets. Then, the server may generate feature images based on the packet transmission attribute information, and then identify the feature images by using a pre-trained image classification model, to obtain a target application identifier corresponding to the target data stream. In this way, when a payload field in a packet is encrypted or uses a private application layer protocol, the server identifies, based on packet transmission attribute information instead of the payload field, an application identifier corresponding to a data stream. This can avoid parsing of the payload field in the packet, thereby improving accuracy of identifying the application identifier corresponding to the data stream.

In one embodiment, packet transmission attribute information of each packet includes at least one type of packet transmission attribute information; and the generating feature images of the packet transmission attribute information of the N consecutive packets based on the packet transmission attribute information of the N consecutive packets includes: organizing a same type of packet transmission attribute information in the packet transmission attribute information of the N consecutive packets into a sequence in an order of packet arrival time, to obtain at least one type of transmission attribute information sequence; determining a static behavior feature matrix and a dynamic behavior feature matrix that are corresponding to each type of transmission attribute information sequence in the at least one type of transmission attribute information sequence, where the static behavior feature matrix is a feature matrix used to describe a marginal probability distribution $p(I_j)$ of the transmission attribute information sequence, the dynamic behavior feature matrix is a feature matrix used to describe a conditional probability distribution $p(I_{j+1}|I_j)$ of the transmission attribute information sequence, $I_j$ is packet transmission attribute information corresponding to any packet of the N consecutive packets in the transmission attribute information sequence, and $I_{j+1}$ is packet transmission attribute information corresponding to a next packet of the any packet in the transmission attribute information sequence; and using the static behavior feature matrix and the dynamic behavior feature matrix as the feature images of the packet transmission attribute information of the N consecutive packets.

According to one embodiment, the server may obtain a plurality of types of packet transmission attribute information, generate a transmission attribute information sequence corresponding to each type of packet transmission attribute information, and then generate feature images based on probability distribution information of the transmission attribute information sequence. Describing a feature of the data stream by using the probability distribution information of each type of transmission attribute information sequence does not depend on a manual design, has a stronger generalization capability, and can more accurately describe the data stream.

In one embodiment, the packet transmission attribute information of each packet includes one or more of the following types of packet transmission attribute information: a packet length, a packet arrival time interval, and a packet upstream/downstream attribute.

According to one embodiment, the packet transmission attribute information may be the packet length, the packet arrival time interval, or the packet upstream/downstream attribute, and is used to describe behavior information of the data stream, and a payload field in a packet does not need to be parsed. Therefore, even if the data stream is encrypted or uses a private application layer protocol, accuracy of identifying the application identifier corresponding to the data stream can be ensured, avoiding invasion of user privacy.

In one embodiment, the determining a static behavior feature matrix and a dynamic behavior feature matrix that are corresponding to each type of transmission attribute information sequence in the at least one type of transmission attribute information sequence includes: for each transmission attribute information sequence in the at least one type of transmission attribute information sequence $\{I_1, I_2, \ldots, I_j, \ldots, I_{n+1}\}$, obtaining a first subsequence $\{I_1, I_2, \ldots, I_j, \ldots, I_n\}$ and a second subsequence $\{I_2, I_3, \ldots, I_j, \ldots, I_{n+1}\}$ in the transmission attribute information sequence, and mapping the first subsequence and the second subsequence to multidimensional feature space by using a preset mapping function $\varphi(I_j)$, to obtain a first multidimensional feature matrix $\Phi=[\varphi(I_1), \varphi(I_2), \ldots, \varphi(I_j), \varphi(I_n)]$ corresponding to the first subsequence and a second multidimensional feature matrix $\Phi_+=[\varphi(I_2), \varphi(I_3), \ldots, \varphi(I_j), \ldots, \varphi(I_{n+1})]$ corresponding to the second subsequence, where n+1 is a sequence length of the transmission attribute information sequence; determining, based on the first multidimensional feature matrix and a formula $\mathfrak{R}_{st}=1/n\Phi\Phi^T$ (1), a static behavior feature matrix corresponding to the transmission attribute information sequence, where $\mathfrak{R}_{st}$ is the static behavior feature matrix, $\Phi^T$ is transpose of the first multidimensional feature matrix, and n is a sequence length of the first subsequence; and determining, based on the first multidimensional feature matrix, the second multidimensional feature matrix, and a formula $\mathfrak{R}_{dn}=(\Phi_+\Phi^T)(\Phi\Phi^T+\lambda I)^{-1}$ (2), a dynamic behavior feature matrix corresponding to the transmission attribute information sequence, where $\mathfrak{R}_{dn}$ is the dynamic behavior feature matrix, $\lambda$ is a regular term coefficient, and I is an identity matrix.

According to one embodiment, the first subsequence and the second subsequence in the transmission attribute information sequence are mapped to the multidimensional feature space by using the preset mapping function $\varphi(I_j)$, to obtain the first multidimensional feature matrix $\Phi$ and the second multidimensional feature matrix $\Phi_+$, respectively. Then, the first multidimensional feature matrix $\Phi$ is input into the formula (1), to obtain the matrix $\mathfrak{R}_{st}$ through calculation, and the corresponding static behavior feature matrix may be obtained. Naturally, the static behavior feature matrix may be described as a static behavior feature image. Similarly, the first multidimensional feature matrix $\Phi$ and the second multidimensional feature matrix $\Phi_+$ are input into the formula (2), to obtain the matrix $\mathfrak{R}_{dn}$ through calculation, and the corresponding dynamic behavior feature matrix may be obtained. Naturally, the dynamic behavior feature matrix may be described as a dynamic behavior feature image. Both a static behavior feature image and a dynamic behavior feature image may be obtained for each type of transmission attribute information sequence. If there are M types of transmission attribute information sequences, 2×M images may be obtained, that is, a feature image of 2×M channels may be obtained.

In one embodiment, the image classification model includes a convolutional neural network; and when the feature images are input into the image classification model, auxiliary identification information is further input through a fully-connected layer of the image classification model, where the auxiliary identification information includes at least one or more of the following: the packet transmission attribute information of the N consecutive packets, an Internet Protocol (IP) address of a background server corresponding to the target data stream, and a port identifier of the background server.

According to one embodiment, during identification by using the image classification model, the IP address and the port identifier of the background server may be normalized and input into a first fully-connected layer. In addition, the packet transmission attribute information of the N consecutive packets may be further input into the first fully-connected layer, and the input packet transmission attribute information may alternatively be replaced with the transmission attribute information sequence. The packet transmission attribute information of the N consecutive packets and the IP address and the port identifier corresponding to the background server can also be used to describe a difference between different applications. Therefore, inputting the foregoing information through the fully-connected layer can improve accuracy of identifying the application identifier corresponding to the data stream.

According to one embodiment, a data stream identification apparatus is provided. The apparatus includes at least one module, and the at least one module is configured to implement the data stream identification method provided in the first aspect.

According to one embodiment, a server is provided. The server includes a receiver and a processor. The processor is configured to execute an instruction stored in a memory. The processor executes the instruction to implement the data stream identification method provided in the first aspect.

According to one embodiment, a computer readable storage medium is provided, where the computer readable storage medium includes an instruction. When the instruction runs on a server, the server performs the method according to the first aspect.

According to one embodiment, a computer program product including an instruction is provided. When the computer program product runs on a server, the server performs the method according to the first aspect.

The technical solutions provided in the embodiments of this application may bring the following beneficial effects:

In the embodiments of this application, when starting to receive a target data stream, a server may obtain packet transmission attribute information of N consecutive packets in the target data stream; generate feature images of the packet transmission attribute information of the N consecutive packets based on the packet transmission attribute information of the N consecutive packets; and input the feature images into a pre-trained image classification model, to obtain a target application identifier corresponding to the target data stream. In this way, when a payload field in a packet is encrypted or uses a private application layer protocol, an application identifier is identified based on packet transmission attribute information. This can avoid parsing of the payload field in the packet, thereby improving accuracy of identifying the application identifier corresponding to a data stream.

BRIEF DESCRIPTION OF DRAWINGS

The accompanying drawings herein are incorporated into this specification and are a part of this specification, show embodiments compliant with this application, and are used to explain a principle of this application together with this specification. In the accompanying drawings.

The foregoing accompanying drawings show specific embodiments of this disclosure, and more detailed descriptions are provided in the following. The accompanying drawings and text descriptions are not intended to limit the scope of the idea of this disclosure in any manner, but are intended to describe the concept of this disclosure to a person skilled in the art with reference to particular embodiments.

DESCRIPTION OF EMBODIMENTS

The embodiments of this disclosure provide a data stream identification method, and the method may be implemented by a server that should identify an application identifier corresponding to a data stream. The server may collect a data stream of each application, or may receive a data stream of each application that is collected by a gateway or another data stream collection device. To avoid that accuracy of identifying an application identifier corresponding to a data stream is relatively low due to parsing of a payload field in a packet, in a process of identifying the application identifier corresponding to the data stream, the server may obtain packet transmission attribute information of the first N packets in the data stream, instead of parsing payload fields in the packets; generate corresponding feature images based on the packet transmission attribute information of the N consecutive packets; and then input the feature images into a pre-trained image classification model, and output the application identifier corresponding to the data stream.

Figure 1:
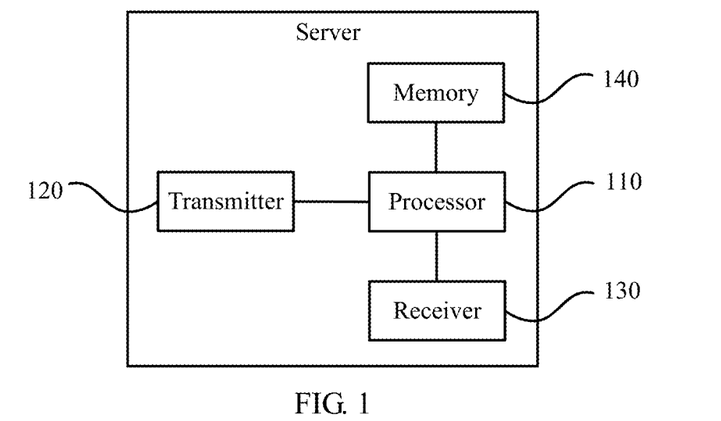
FIG. 1 is a schematic structural diagram of a server according to an embodiment of this disclosure.

The server may include a processor 110, a transmitter 120, and a receiver 130. Both the receiver 130 and the transmitter 120 may be connected to the processor 110, as shown in FIG. 1. The receiver 130 may be configured to receive a message or data, that is, may receive a data stream of each application. The transmitter 120 and the receiver 130 each may be a network adapter. The transmitter 120 may be configured to send a message or data. The processor 110 may be a control center of the server, and connects various parts of the entire server by using various interfaces and lines, such as the receiver 130 and the transmitter 120. In this application, the processor 110 may be a central processing unit (CPU), and may be configured to perform related processing, for example, identify an application identifier corresponding to a data stream. Optionally, the processor 110 may include one or more processing units. An application processor and a modem processor may be integrated into the processor 110. The application processor mainly processes an operating system, and the modem processor mainly processes wireless communication. The processor 110 may alternatively be a digital signal processor, an application-specific integrated circuit, a field-programmable gate array or another programmable logic device, or the like. The server may further include a memory 140. The memory 140 may be configured to store a software program and a module. The processor 110 executes various function applications of the server and processes data by reading the software program and the module that are stored in the memory.

Figure 2:
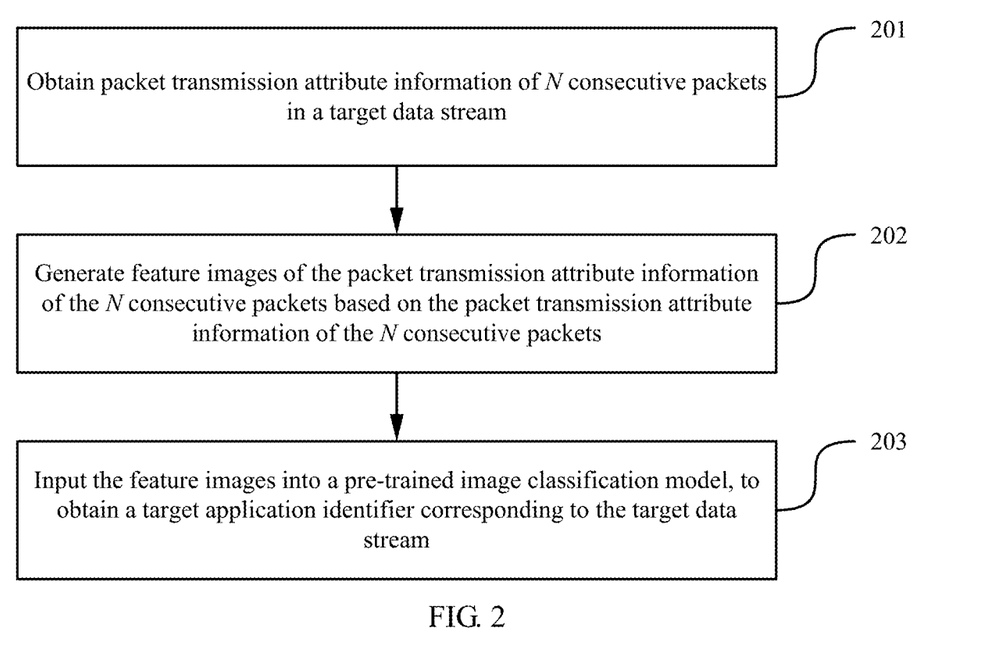
FIG. 2 is a flowchart of a data stream identification method according to an embodiment of this disclosure.
Figure 3:
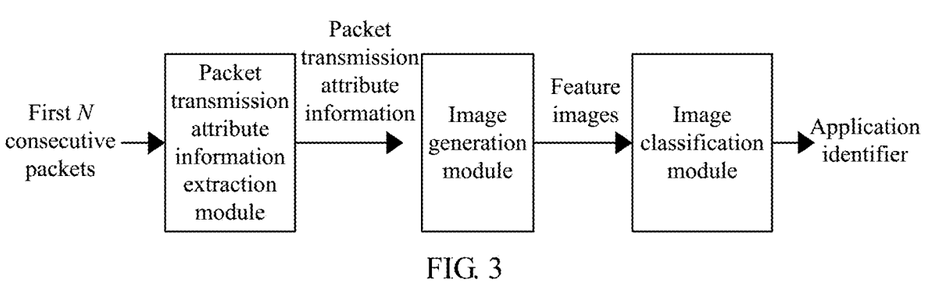
FIG. 3 is a schematic diagram of a data stream identification module according to an embodiment of this disclosure.

With reference to specific implementations, the following details a flowchart of a data stream identification method shown in FIG. 2 and a schematic diagram of a data stream identification module shown in FIG. 3. Content may be as follows.

Block 201. Obtain packet transmission attribute information of N consecutive packets in a target data stream.

N is a positive integer greater than 1. Packet transmission attribute information of each packet includes at least one type of packet transmission attribute information; and there may be one or more of the following types of packet transmission attribute information: a packet length, a packet arrival time interval, and a packet upstream/downstream attribute. Alternatively, there may be another type of packet transmission attribute information. This is not limited herein. The packet transmission attribute information is used to describe behavior information of the data stream, and a payload field in a packet does not need to be parsed. Therefore, even if the data stream is encrypted or uses a private application layer protocol, accuracy of identifying an application identifier corresponding to the data stream can also be ensured, avoiding invasion of user privacy.

During implementation, the data stream may be labeled by using a quintuple. The quintuple is a set consisting of five fields in a communications network: a source Internet Protocol (IP) address, a source port identifier, a destination IP address, a destination port identifier, and the Transport Layer Protocol. A data stream may include a plurality of upstream/downstream packets, and each packet includes information such as a packet header and a payload field. A server may receive data streams transmitted by all applications in a network. Whenever starting to receive a data stream, the server may input the first N received consecutive packets to a packet transmission attribute information extraction module 301. A value of N may be preset as required. An example in which N is 10 is used in this embodiment, that is, the first 10 consecutive packets in a data stream are extracted. In one embodiment, only packet transmission attribute information of the first several packets is used, and the data stream is identified with no need to wait until the data stream is completely transmitted. This can more rapidly complete data stream identification, improve identification efficiency, and implement online data stream identification.

The packet transmission attribute information extraction module 301 may output packet transmission attribute information of each packet, for example, output a packet length $s_j$ of each packet, an arrival time interval $\Delta t_j$ of each packet, and an upstream/downstream attribute $d_j$ of each packet. The packet transmission attribute information may be used to represent behavior information of the data stream. $d_j \in \{0,1\}$, "0" may represent an upstream packet, and "1" may represent a downstream packet. The packet arrival time interval may be an interval between a time at which a packet is received and a time at which a previous packet is received.

Optionally, the server may organize a same type of packet transmission attribute information in the packet transmission attribute information of the N consecutive packets into a sequence in an order of packet arrival time, to obtain at least one type of transmission attribute information sequence.

Figure 4:
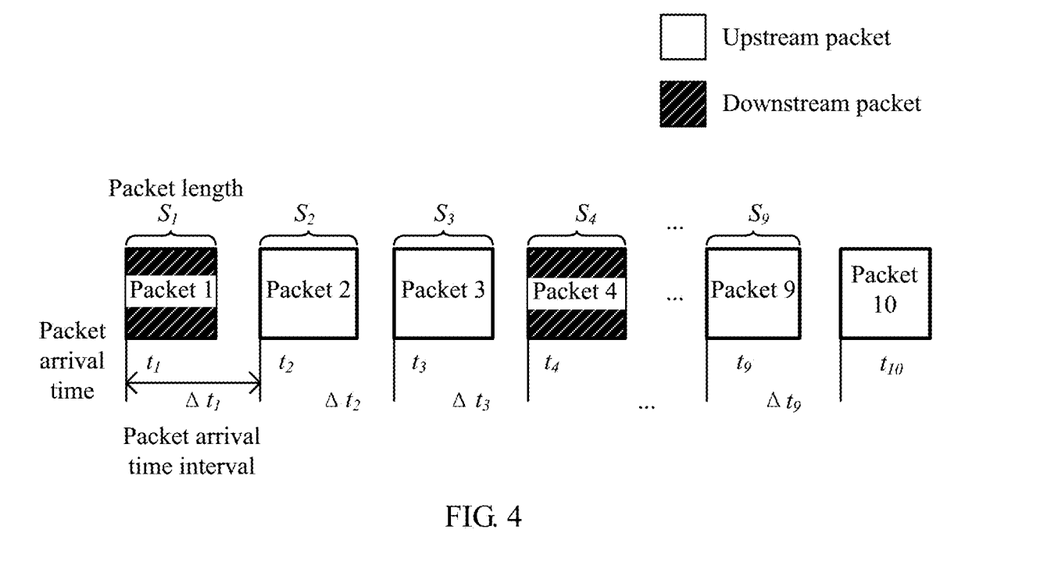
FIG. 4 is a schematic diagram of packet transmission attribute information according to an embodiment of this disclosure.

According to a schematic diagram of packet transmission attribute information shown in FIG. 4, a same type of packet transmission attribute information may be organized into a sequence in an order of packet arrival time; and a packet length sequence, a packet arrival time interval sequence, and a packet upstream/downstream attribute sequence may be obtained. Using an example in which N is 10, the foregoing sequences may be listed in Table 1:

TABLE 1

| Transmission attribute information sequence | |
|---|---|
| Packet length sequence | $\{s_1, s_2, s_3, s_4, s_5, s_6, s_7, s_8, s_9\}$ |
| Packet arrival time interval sequence | $\{\Delta t_1, \Delta t_2, \Delta t_3, \Delta t_4, \Delta t_5, \Delta t_6, \Delta t_7, \Delta t_8, \Delta t_9\}$ |
| Packet upstream/ downstream attribute sequence | $\{d_1, d_2, d_3, d_4, d_5, d_6, d_7, d_8, d_9\}$ |

Block 202. Generate feature images of the packet transmission attribute information of the N consecutive packets based on the packet transmission attribute information of the N consecutive packets.

During implementation, the server may input the packet transmission attribute information of the N consecutive packets into an image generation module 302. A feature of the data stream may be described based on the packet transmission attribute information of each packet. The feature of the data stream may be described by using coarse-grained statistics such as a packet length mean and a packet length variance, or may be described based on probability distribution information of each type of transmission attribute information sequence. The feature of the data stream may be in a form of a feature matrix. Naturally, an image may be used to represent the feature matrix. In other words, the feature images corresponding to the packet transmission attribute information of the N consecutive packets are obtained, and feature images corresponding to the data stream are output. It can be learned through experiments that compared with describing the feature of the data stream by using the coarse-grained statistics, describing the feature of the data stream by using the probability distribution information of each type of transmission attribute information sequence does not depend on a manual design, has a stronger generalization capability, and can more accurately describe the data stream. Therefore, in this solution, probability distribution information of each type of transmission attribute information sequence is mainly used to describe the feature of the data stream, and a specific process may be as follows.

Optionally, the server may use a static behavior feature matrix to describe a marginal probability distribution of each type of transmission attribute information sequence, and use a dynamic behavior feature matrix to describe a relationship between two consecutive packets, that is, to describe a conditional probability distribution. Specifically, after each type of transmission attribute information sequence is obtained in the foregoing process, the server may determine a static behavior feature matrix and a dynamic behavior feature matrix that are corresponding to each type of transmission attribute information sequence in the at least one type of transmission attribute information sequence, and use the static behavior feature matrix and the dynamic behavior feature matrix as the feature images of the packet transmission attribute information of the N consecutive packets.

The static behavior feature matrix is a feature matrix used to describe a marginal probability distribution $p(I_j)$ of the transmission attribute information sequence, the dynamic behavior feature matrix is a feature matrix used to describe a conditional probability distribution $p(I_{j+1}|I_j)$ of the transmission attribute information sequence, $I_j$ is packet transmission attribute information corresponding to any packet of the N consecutive packets in the transmission attribute information sequence, and $I_{j+1}$ is packet transmission attribute information corresponding to a next packet of the any packet in the transmission attribute information sequence.

During implementation, for each transmission attribute information sequence in the at least one type of transmission attribute information sequence $\{I_1, I_2, \ldots, I_j, \ldots, I_{n+1}\}$, a first subsequence $\{I_1, I_2, \ldots, I_j, \ldots, I_{n+1}\}$ and a second subsequence $\{I_2, I_3, \ldots, I_j, \ldots, I_{n+1}\}$ in the transmission attribute information sequence are obtained, and the first subsequence and the second subsequence are mapped to multidimensional feature space by using a preset mapping function $\varphi(I_j)$, to obtain a first multidimensional feature matrix $\Phi=[\varphi(I_1), \varphi(I_2), \ldots, \varphi(I_j), \ldots \varphi(I_n)]$ corresponding to the first subsequence and a second multidimensional feature matrix $\Phi_+=[\varphi(I_2), \varphi(I_3), \ldots, \varphi(I_j), \ldots, \varphi(I_{n+1})]$ corresponding to the second subsequence, where n+1 is a sequence length of the transmission attribute information sequence.

The transmission attribute information sequence $\{I_1, I_2, \ldots, I_j, \ldots, I_{n+1}\}$ may be any one of the foregoing transmission attribute information sequences, that is, may be the packet length sequence, the packet arrival time interval, or the packet upstream/downstream attribute sequence. Using an example in which the first 10 consecutive packets in a data stream are extracted, that is, n+1=10 herein, the preset mapping function $\varphi(I_j)$ may be a Fourier series expansion, and after the first subsequence is mapped to the multidimensional feature space, the corresponding first multidimensional feature matrix is obtained as follows:

$$\Phi = \begin{bmatrix} \cos(\omega_1 I_1) & \cos(\omega_1 I_2) & \Lambda & \cos(\omega_1 I_9) \\ \sin(\omega_1 I_1) & \sin(\omega_1 I_2) & \Lambda & \sin(\omega_1 I_9) \\ M & M & O & M \\ \cos(\omega_k I_1) & \cos(\omega_k I_2) & \Lambda & \cos(\omega_k I_9) \\ \sin(\omega_k I_1) & \sin(\omega_k I_2) & \Lambda & \sin(\omega_k I_9) \end{bmatrix},$$

where $\omega_i$ (i=1, 2, . . . , k) is k random numbers obtained through sampling from a normal distribution.

Similarly, the second multidimensional feature matrix corresponding to the second subsequence may be obtained as follows:

$$\Phi_+ = \begin{bmatrix} \cos(\omega_1 I_2) & \cos(\omega_1 I_3) & \Lambda & \cos(\omega_1 I_{10}) \\ \sin(\omega_1 I_2) & \sin(\omega_1 I_3) & \Lambda & \sin(\omega_1 I_{10}) \\ M & M & O & M \\ \cos(\omega_k I_2) & \cos(\omega_k I_3) & \Lambda & \cos(\omega_k I_{10}) \\ \sin(\omega_k I_2) & \sin(\omega_k I_3) & \Lambda & \sin(\omega_k I_{10}) \end{bmatrix}.$$

The static behavior feature matrix corresponding to the transmission attribute information sequence is determined based on the first multidimensional feature matrix and a formula (1):

$$\Re_{st} = \frac{1}{n}\Phi\Phi^T \quad (1)$$

where $\Re_{st}$ is the static behavior feature matrix, $\Phi^T$ is transpose of the first multidimensional feature matrix, and n is a sequence length of the first subsequence.

In other words, the first multidimensional feature matrix $\Phi$ is input into the formula (1), to obtain the matrix $\Re_{st}$ through calculation, and the corresponding static behavior feature matrix may be obtained. Naturally, the static behavior feature matrix may be described as a static behavior feature image.

The dynamic behavior feature matrix corresponding to the transmission attribute information sequence is determined based on the first multidimensional feature matrix, the second multidimensional feature matrix, and a formula (2):

$$\Re_{dn} = (\Phi_+\Phi^T)(\Phi\Phi^T + \lambda I)^{-1} \quad (2)$$

where $\Re_{dn}$ is the dynamic behavior feature matrix, $\lambda$ is a regular term coefficient, I is an identity matrix.

In other words, the first multidimensional feature matrix $\Phi$ and the second multidimensional feature matrix $\Phi_+$ are input into the formula (2), to obtain the matrix $\Re_{dn}$ through calculation, and the corresponding dynamic behavior feature matrix may be obtained. Naturally, the dynamic behavior feature matrix may be described as a dynamic behavior feature image.

Figure 5:
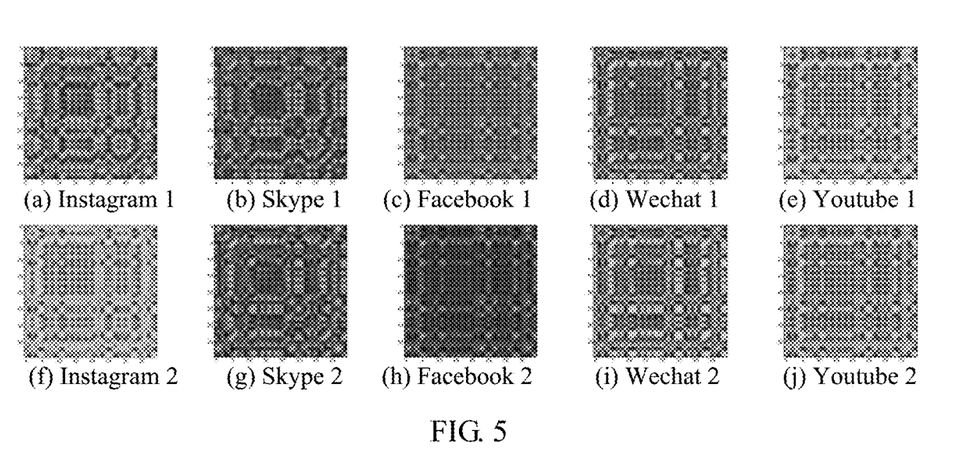
FIG. 5 is static behavior feature images corresponding to packet length sequences of different applications according to an embodiment of this disclosure.

A static behavior feature image and a dynamic behavior feature image may be obtained for each type of transmission attribute information sequence. If there are M types of transmission attribute information sequences, 2×M images may be obtained, that is, a feature image of 2×M channels may be obtained. For example, if there are at least three types of transmission attribute information sequences: the packet length sequence, the packet arrival time interval, and the packet upstream/downstream attribute sequence, a feature image of six channels may be obtained. Static behavior feature images corresponding to packet length sequences of different applications are shown in FIG. 5. It can be seen that feature images generated from different data streams corresponding to a same type of applications have similar texture, and feature images corresponding to different applications differ in local features.

A method, such as a Gaussian mixture model, kernel density estimation, and reproducing kernel Hilbert space embedding, may be used in the foregoing feature image generation process. This is not limited herein.

Block 203. Input the feature images into a pre-trained image classification model, to obtain a target application identifier corresponding to the target data stream.

During implementation, to identify the feature images by using an image classification model, the image classification model may be trained by using the application identifier as a label and by using a plurality of data streams corresponding to a known application identifier, to obtain the trained image classification model. Specifically, an Adaptive Moment Estimation optimizer (ADAM optimizer) may be used to control a learning rate, and multiclass cross entropy is used as a loss function. This is not limited herein.

Further, the server may input the foregoing feature images into the pre-trained image classification model, extract and classify local features of the feature images, and output the application identifier corresponding to the data stream. The image classification model is corresponding to the image classification module 303 in FIG. 3.

Optionally, the image classification model may include a convolutional neural network.

For a case in which the image classification model is the convolutional neural network, when inputting the feature images into the image classification model, the server may further input auxiliary identification information through a fully-connected layer of the image classification model.

The auxiliary identification information includes at least one or more of the following: the packet transmission attribute information of the N consecutive packets, an IP address of a background server corresponding to the data stream, and a port identifier of the background server.

During implementation, the server may determine the IP address and the port identifier corresponding to the background server that are in the quintuple corresponding to the data stream. The background server is a server providing service processing to a corresponding application. The image classification model may be the convolutional neural network, and may be divided into a convolution layer, a maximum pooling layer, and a fully-connected layer. A network structure (such as a quantity of network layers and a size of a convolution kernel) of the convolutional neural network is not limited herein. Further, in a process of identifying the feature images by using the image classification model, the IP address and the port identifier of the background server may be normalized and input into a first fully-connected layer. In addition, the packet transmission attribute information of the N consecutive packets may be further input into the first fully-connected layer, and the input packet attribute information may alternatively be replaced with the foregoing transmission attribute information sequence. The packet transmission attribute information of the N consecutive packets and the IP address and the port identifier corresponding to the background server can also be used to describe a difference between different applications. Therefore, inputting the foregoing information through the fully-connected layer can improve accuracy of identifying the application identifier corresponding to the data stream.

After identifying an application identifier corresponding to each data stream, the server can ensure that an application with a higher priority preferentially performs transmission, may also send an identification result to a communication operator for accurate traffic charging, and may further help researchers analyze traffic distribution of each application. This is not limited herein.

To verify effectiveness of this solution, an experiment is conducted by using data streams of five specific applications. Experimental data is listed in Table 2 below, and a quantity of total data streams exceeds 230,000.

TABLE 2

Experimental data

| Application | Instagram | Skype | Facebook | WeChat | YouTube | Total |
|---|---|---|---|---|---|---|
| Quantity of streams | 26687 | 97834 | 43863 | 53991 | 60913 | 238288 |

During experimental verification, for each data stream, a feature vector $F_r = \{\Delta t_1, \Delta t_2, \ldots, \Delta t_9, s_1, s_2, \ldots, s_9, d_1, d_2, \ldots, d_9, ip\}$ is generated by using the transmission attribute information sequence of the foregoing data stream, where ip is the IP address of the background server corresponding to the data stream. In addition, a statistic is more representative in many algorithms. Therefore, statistics of the packet transmission attribute information of the N consecutive packets may alternatively be used to form a feature vector $F_s=\{mean\_pkt, std\_packet, \ldots, ip\}$ where elements in $F_s$ represent: a packet length mean, a packet length variance, a maximum packet length, and a minimum packet length; a packet time interval mean, a packet time interval variance, a maximum packet time interval, and a minimum packet time interval; a ratio of a quantity of upstream packets to a quantity of downstream packets; and the IP address of the background server.

In the experiment, the following four classification algorithms are compared with this solution: a support vector machine (SVM), a multilayer perceptron (MLP), Naive Bayes (NB), and a decision tree (DT). An application identifier corresponding to each data stream is identified by inputting each of feature vectors $F_r$ and $F_s$ corresponding to the data stream into each of the foregoing four classification algorithms, and accuracy of each classification algorithm is calculated based on an identification result and an application identifier that is actually corresponding to each data stream. In addition, by using the experimental data in Table 2 and the data stream identification method provided in this solution, the application identifier corresponding to the data stream is identified, and accuracy of this solution is calculated. Experimental results are listed in Table 3 and Table 4.

TABLE 3

Experimental results of four classification algorithms

|       | SVM    | MLP    | NB     | DT     |
|-------|--------|--------|--------|--------|
| $F_r$ | 76.93% | 51.43% | 41.06% | 54.96% |
| $F_s$ | 63.57% | 51.02% | 41.66% | 47.18% |

TABLE 4

Experimental result of this solution

| This Solution |
|---------------|
| 88.42%        |

It can be learned from the experimental results that, both accuracy obtained by inputting the feature vector $F_r$ into the different algorithms and accuracy obtained by inputting the feature vector $F_s$ into the different algorithms are lower than the accuracy of this solution. Therefore, this solution can indeed improve accuracy of identifying the application identifier corresponding to the data stream.

In this embodiment of this disclosure, when starting to receive a target data stream, a server may obtain packet transmission attribute information of N consecutive packets in the target data stream; generate feature images of the packet transmission attribute information of the N consecutive packets based on the packet transmission attribute information of the N consecutive packets; and input the feature images into a pre-trained image classification model, to obtain a target application identifier corresponding to the target data stream. In this way, when a payload field in a packet is encrypted or uses a private application layer protocol, an application identifier is identified based on packet transmission attribute information. This can avoid parsing of the payload field in the packet, thereby improving accuracy of identifying the application identifier corresponding to a data stream.

Figure 6:
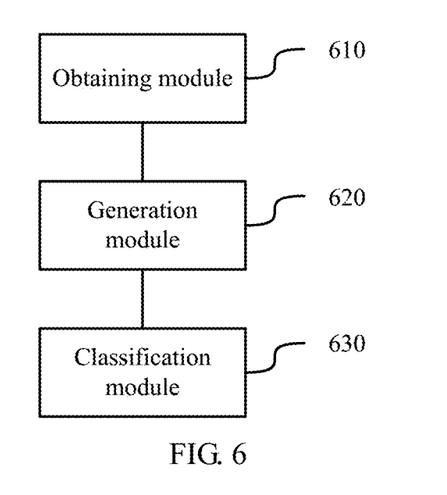
FIG. 6 is a schematic structural diagram of a data stream identification apparatus according to an embodiment of this disclosure.

Based on a same technical concept, an embodiment of this disclosure further provides a data stream identification apparatus. The apparatus may be the foregoing server. As shown in FIG. 6, the apparatus includes:

an obtaining module 610, configured to obtain packet transmission attribute information of N consecutive packets in a target data stream, where N is a positive integer greater than 1, and the obtaining module 610 may specifically implement the obtaining function in the foregoing block 201 and other implicit blocks;

a generation module 620, configured to generate feature images of the packet transmission attribute information of the N consecutive packets based on the packet transmission attribute information of the N consecutive packets, where the generation module 620 may specifically implement the generation function in the foregoing block 202 and other implicit blocks; and a classification module 630, configured to input the feature images into a pre-trained image classification model, to obtain a target application identifier corresponding to the target data stream, where the classification module 630 may specifically implement the classification function in the foregoing block 203 and other implicit blocks.

Optionally, packet transmission attribute information of each packet includes at least one type of packet transmission attribute information; and the generation module 620 is configured to:

organize a same type of packet transmission attribute information in the packet transmission attribute information of the N consecutive packets into a sequence in an order of packet arrival time, to obtain at least one type of transmission attribute information sequence;

determine a static behavior feature matrix and a dynamic behavior feature matrix that are corresponding to each type of transmission attribute information sequence in the at least one type of transmission attribute information sequence, where the static behavior feature matrix is a feature matrix used to describe a marginal probability distribution $p(I_j)$ of the transmission attribute information sequence, the dynamic behavior feature matrix is a feature matrix used to describe a conditional probability distribution $p(I_{j+1}|I_j)$ of the transmission attribute information sequence, $I_j$ is packet transmission attribute information corresponding to any packet of the N consecutive packets in the transmission attribute information sequence, and $I_{j+1}$ is packet transmission attribute information corresponding to a next packet of the any packet in the transmission attribute information sequence; and use the static behavior feature matrix and the dynamic behavior feature matrix as the feature images of the packet transmission attribute information of the N consecutive packets.

Optionally, the packet transmission attribute information of each packet includes one or more of the following types of packet transmission attribute information: a packet length, a packet arrival time interval, and a packet upstream/downstream attribute.

Optionally, the generation module 620 is configured to:

for each transmission attribute information sequence in the at least one type of transmission attribute information sequence $\{I_1, I_2, \ldots, I_j, \ldots, I_{n+1}\}$, obtain a first subsequence $\{I_1, I_2, \ldots, I_j, \ldots, I_{n+1}\}$ and a second subsequence $\{I_2, I_3, \ldots, I_j, \ldots, I_{n+1}\}$ in the transmission attribute information sequence, and map the first subsequence and the second subsequence to multidimensional feature space by using a preset mapping function $\varphi(I_j)$, to obtain a first multidimensional feature matrix $\Phi=[\varphi(I_1), \varphi(I_2), \ldots, \varphi(I_j),$ $\varphi(I_n)$] corresponding to the first subsequence and a second multidimensional feature matrix $\Phi_+=[\varphi(I_2), \varphi(I_3), \ldots, \varphi(I_j), \ldots, \varphi(I_{n+1})]$ corresponding to the second subsequence, where n+1 is a sequence length of the transmission attribute information sequence;

determine, based on the first multidimensional feature matrix and a formula $$\mathfrak{R}_{st} = \frac{1}{n}\Phi\Phi^T,$$

a static behavior feature matrix corresponding to the transmission attribute information sequence, where $\mathfrak{R}_{st}$ is the static behavior feature matrix, $\Phi^T$ is transpose of the first multidimensional feature matrix, and n is a sequence length of the first subsequence; and determine, based on the first multidimensional feature matrix, the second multidimensional feature matrix, and a formula $\mathfrak{R}_{dn}=(\Phi_+\Phi^T)(\Phi\Phi^T+\lambda I)^{-1}$ a dynamic behavior feature matrix corresponding to the transmission attribute information sequence, where $\mathfrak{R}_{dn}$ is the dynamic behavior feature matrix, $\lambda$ is a regular term coefficient, and I is an identity matrix.

Optionally, the image classification model includes a convolutional neural network.

Figure 7:
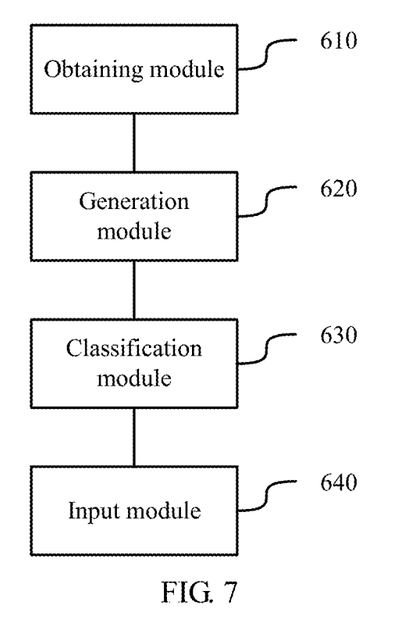
FIG. 7 is a schematic structural diagram of a data stream identification apparatus according to an embodiment of this disclosure.

As shown in FIG. 7, the apparatus further includes:

an input module 640, configured to: when the feature images are input into the image classification model, further input auxiliary identification information through a fully-connected layer of the image classification model, where the auxiliary identification information includes at least one or more of the following: the packet transmission attribute information of the N consecutive packets, an IP address of a background server corresponding to the target data stream, and a port identifier of the background server.

It should be noted that the obtaining module 610 may be implemented by a receiver, the generation module 620 may be implemented by a processor, the classification module 630 may be implemented by the processor, and the input module 640 may be implemented by the processor.

In this embodiment of this disclosure, when starting to receive a target data stream, a server may obtain packet transmission attribute information of N consecutive packets in the target data stream; generate feature images of the packet transmission attribute information of the N consecutive packets based on the packet transmission attribute information of the N consecutive packets; and input the feature images into a pre-trained image classification model, to obtain a target application identifier corresponding to the target data stream. In this way, when a payload field in a packet is encrypted or uses a private application layer protocol, an application identifier is identified based on packet transmission attribute information. This can avoid parsing of the payload field in the packet, thereby improving accuracy of identifying the application identifier corresponding to a data stream.

It should be noted that when the data stream identification apparatus provided in the foregoing embodiment identifies an application identifier corresponding to a data stream, only division of the foregoing function modules is used as an example for description. In actual application, the foregoing functions may be allocated to different function modules for implementation as required. In other words, an internal structure of the server is divided into different function modules to complete all or some of the functions described above. In addition, the data stream identification apparatus and the data stream identification method provided in the foregoing embodiments belong to a same concept. For a specific implementation process of the data stream identification apparatus, refer to the method embodiment, and details are not repeated herein.

In the foregoing embodiments, all or some of the functions may be implemented by using software, hardware, or any combination thereof. When being implemented by using software, all or some of the functions may be implemented in a form of a computer program product. The computer program product includes one or more computer instructions. When the computer program instructions are loaded and executed on a host, all or some of the procedures or functions described in the embodiments of this disclosure are generated. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (such as a coaxial optical cable, an optical fiber, or a digital subscriber line (DSL)) or wireless (such as infrared, radio, or microwave) manner. The computer readable storage medium may be any usable medium accessible by the host, or a data storage device, such as a server or a data center, integrating one or more usable media. The usable medium may be a magnetic medium (such as a floppy disk, a hard disk, or a magnetic tape), an optical medium (such as a digital video disk (DVD)), or a semiconductor medium (such as a solid-state drive).

The foregoing descriptions are merely example embodiments of this disclosure, but are not intended to limit this disclosure. Any modification, equivalent replacement, or improvement made without departing from the spirit and principle of this disclosure shall fall within the protection scope of this disclosure.

What is claimed is:

1. A method, comprising:
    obtaining packet transmission attribute information of N consecutive packets in a target data stream, wherein N comprises a positive integer greater than 1;
    generating feature images of the packet transmission attribute information of the N consecutive packets based on probability distribution information of the packet transmission attribute information of the N consecutive packets; and
    inputting the feature images into a pre-trained image classification model, to obtain a target application identifier corresponding to the target data stream.

2. The method of claim 1, wherein packet transmission attribute information of each packet comprises at least one type of packet transmission attribute information; and
    generating feature images of the packet transmission attribute information of the N consecutive packets based on the probability distribution information of the packet transmission attribute information of the N consecutive packets comprises:
    organizing a same type of packet transmission attribute information in the packet transmission attribute information of the N consecutive packets into a sequence in an order of packet arrival time, to obtain at least one type of transmission attribute information sequence;
    determining a static behavior feature matrix and a dynamic behavior feature matrix that are corresponding to each type of transmission attribute information sequence in the at least one type of transmission attribute information sequence, wherein the static behavior feature matrix comprises a feature matrix used to describe a marginal probability distribution p(I$_j$) of the transmission attribute information sequence, the dynamic behavior feature matrix comprises a feature matrix used to describe a conditional probability distribution p(I$_{j+1}$|I$_j$) of the transmission attribute information sequence, I$_j$ comprises packet transmission attribute information corresponding to any packet of the N consecutive packets in the transmission attribute information sequence, and I$_{j+1}$ comprises packet transmission attribute information corresponding to a next packet of the any packet in the transmission attribute information sequence; and using the static behavior feature matrix and the dynamic behavior feature matrix as the feature images of the packet transmission attribute information of the N consecutive packets.

3. The method of claim 2, wherein the packet transmission attribute information of each packet comprises one or more of the following types of packet transmission attribute information: a packet length, a packet arrival time interval, and a packet upstream/downstream attribute.

4. The method of claim 2, wherein the determining a static behavior feature matrix and a dynamic behavior feature matrix that are corresponding to each type of transmission attribute information sequence in the at least one type of transmission attribute information sequence comprises:

for each transmission attribute information sequence in the at least one type of transmission attribute information sequence $\{I_1, I_2, \ldots, I_j, \ldots I_{n+1}\}$, obtaining a first subsequence $\{I_1, I_2, \ldots, I_j, \ldots, I_n\}$ and a second subsequence $\{I_2, I_3, \ldots, I_j, \ldots, I_{n+1}\}$ in the transmission attribute information sequence, and mapping the first subsequence and the second subsequence to multidimensional feature space by using a preset mapping function $\varphi(I_j)$, to obtain a first multidimensional feature matrix $\Phi=[\varphi(I_1), \varphi(I_2), \ldots, \varphi(I_j), \ldots, \varphi(I_n)]$ corresponding to the first subsequence and a second multidimensional feature matrix $\Phi_+=[\varphi(I_2), \varphi(I_3), \ldots, \varphi(I_j), \ldots, \varphi(I_{n+1})]$ corresponding to the second subsequence, wherein n+1 comprises a sequence length of the transmission attribute information sequence;

determining, based on the first multidimensional feature matrix and a formula $$\Re_{st} = \frac{1}{n}\Phi\Phi^T,$$

a static behavior feature matrix corresponding to the transmission attribute information sequence, wherein $\Re_{st}$ comprises the static behavior feature matrix, $\Phi^T$ comprises a transpose of the first multidimensional feature matrix, and n comprises a sequence length of the first subsequence; and determining, based on the first multidimensional feature matrix, the second multidimensional feature matrix, and a formula $\Re_{dn}=(\Phi_+\Phi^T)(\Phi\Phi^T+\lambda I)^{-1}$, a dynamic behavior feature matrix corresponding to the transmission attribute information sequence, wherein $\Re_{dn}$ comprises the dynamic behavior feature matrix, $\lambda$ comprises a regular term coefficient, and I comprises an identity matrix.

5. The method of claim 1, wherein the image classification model comprises a convolutional neural network; and the method further comprises:
when the feature images are input into the image classification model, inputting auxiliary identification information through a fully-connected layer of the image classification model, wherein
the auxiliary identification information comprises at least one or more of the following: the packet transmission attribute information of the N consecutive packets, an Internet Protocol (IP) address of a background server corresponding to the target data stream, and a port identifier of the background server.

6. An apparatus, comprising a memory and a processor operatively coupled to the memory, wherein the processor, wherein the processor is configured to:

obtain packet transmission attribute information of N consecutive packets in a target data stream, wherein N comprises a positive integer greater than 1;

generate feature images of the packet transmission attribute information of the N consecutive packets based on probability distribution information of the packet transmission attribute information of the N consecutive packets; and input the feature images into a pre-trained image classification model, to obtain a target application identifier corresponding to the target data stream.

7. The apparatus of claim 6, wherein packet transmission attribute information of each packet comprises at least one type of packet transmission attribute information; and the processor is further configured to:
organize a same type of packet transmission attribute information in the packet transmission attribute information of the N consecutive packets into a sequence in an order of packet arrival time, to obtain at least one type of transmission attribute information sequence;

determine a static behavior feature matrix and a dynamic behavior feature matrix that are corresponding to each type of transmission attribute information sequence in the at least one type of transmission attribute information sequence, wherein the static behavior feature matrix comprises a feature matrix used to describe a marginal probability distribution p(I$_j$) of the transmission attribute information sequence, the dynamic behavior feature matrix comprises a feature matrix used to describe a conditional probability distribution p(I$_{j+1}$|I$_j$) of the transmission attribute information sequence, I$_j$ comprises packet transmission attribute information corresponding to any packet of the N consecutive packets in the transmission attribute information sequence, and I$_{j+1}$ comprises packet transmission attribute information corresponding to a next packet of the any packet in the transmission attribute information sequence; and use the static behavior feature matrix and the dynamic behavior feature matrix as the feature images of the packet transmission attribute information of the N consecutive packets.

8. The apparatus of claim 7, wherein the packet transmission attribute information of each packet comprises one or more of the following types of packet transmission attribute information: a packet length, a packet arrival time interval, and a packet upstream/downstream attribute.

9. The apparatus of claim 7, wherein the processor is further configured to:

for each transmission attribute information sequence in the at least one type of transmission attribute information sequence $\{I_1, I_2, \ldots, I_j, \ldots, I_{n+1}\}$, obtain a first subsequence $\{I_1, I_2, \ldots, I_j, \ldots, I_n\}$ and a second subsequence $\{I_2, I_3, \ldots, I_j, \ldots, I_{n+1}\}$ in the transmission attribute information sequence, and map the first subsequence and the second subsequence to multidimensional feature space by using a preset mapping function $\varphi(I_j)$, to obtain a first multidimensional feature matrix $\Phi=[\varphi(I_1), \varphi(I_2), \ldots, \varphi(I_j), \ldots, \varphi(I_n)]$ corresponding to the first subsequence and a second multidimensional feature matrix $\Phi_+=[\varphi(I_2), \varphi(I_3), \ldots, \varphi(I_j), \ldots, \varphi(I_{n+1})]$ corresponding to the second subsequence, wherein n+1 comprises a sequence length of the transmission attribute information sequence;

determine, based on the first multidimensional feature matrix and a formula a $$\Re_{st} = \frac{1}{n}\Phi\Phi^T,$$

static behavior feature matrix corresponding to the transmission attribute information sequence, wherein $\Re_{st}$ comprises the static behavior feature matrix, $\Phi^T$ comprises a transpose of the first multidimensional feature matrix, and n comprises a sequence length of the first subsequence; and determine, based on the first multidimensional feature matrix, the second multidimensional feature matrix, and a formula $\Re_{dn}=(\Phi_+\Phi^T)(\Phi\Phi^T+\lambda I)^{-1}$, a dynamic behavior feature matrix corresponding to the transmission attribute information sequence, wherein $\Re_{dn}$ comprises the dynamic behavior feature matrix, $\lambda$ comprises a regular term coefficient, and I comprises an identity matrix.

10. The apparatus of claim 6, wherein the image classification model comprises a convolutional neural network; and the processor is further configured to: when the feature images are input into the image classification model, further input auxiliary identification information through a fully-connected layer of the image classification model, wherein the auxiliary identification information comprises at least one or more of the following: the packet transmission attribute information of the N consecutive packets, an Internet Protocol (IP) address of a background server corresponding to the target data stream, and a port identifier of the background server.

11. A server, wherein the server comprises a receiver and a processor, wherein the receiver is configured to obtain packet transmission attribute information of N consecutive packets in a target data stream, wherein N comprises a positive integer greater than 1; and the processor is configured to: generate feature images of the packet transmission attribute information of the N consecutive packets based on probability distribution information of the packet transmission attribute information of the N consecutive packets; and input the feature images into a pre-trained image classification model, to obtain a target application identifier corresponding to the target data stream.

12. The server of claim 11, wherein packet transmission attribute information of each packet comprises at least one type of packet transmission attribute information; and the processor is further configured to:

organize a same type of packet transmission attribute information in the packet transmission attribute information of the N consecutive packets into a sequence in an order of packet arrival time, to obtain at least one type of transmission attribute information sequence;

determine a static behavior feature matrix and a dynamic behavior feature matrix that are corresponding to each type of transmission attribute information sequence in the at least one type of transmission attribute information sequence, wherein the static behavior feature matrix comprises a feature matrix used to describe a marginal probability distribution $p(I_j)$ of the transmission attribute information sequence, the dynamic behavior feature matrix comprises a feature matrix used to describe a conditional probability distribution $p(I_{j+1}|I_j)$ of the transmission attribute information sequence, $I_j$ comprises packet transmission attribute information corresponding to any packet of the N consecutive packets in the transmission attribute information sequence, and $I_{j+1}$ comprises packet transmission attribute information corresponding to a next packet of the any packet in the transmission attribute information sequence; and use the static behavior feature matrix and the dynamic behavior feature matrix as the feature images of the packet transmission attribute information of the N consecutive packets.

13. The server of claim 12, wherein the packet transmission attribute information of each packet comprises one or more of the following types of packet transmission attribute information: a packet length, a packet arrival time interval, and a packet upstream/downstream attribute.

14. The server of claim 12, wherein the processor is further configured to:

for each transmission attribute information sequence in the at least one type of transmission attribute information sequence $\{I_1, I_2, \ldots, I_j, \ldots, I_{n+1}\}$, obtain a first subsequence $\{I_1, I_2, \ldots, I_j, \ldots, I_n\}$ and a second subsequence $\{I_2, I_3, \ldots, I_j, \ldots, I_{n+1}\}$ in the transmission attribute information sequence, and map the first subsequence and the second subsequence to multidimensional feature space by using a preset mapping function $\varphi(I_j)$, to obtain a first multidimensional feature matrix $\Phi=[\varphi(I_1), \varphi(I_2), \ldots, \varphi(I_j), \varphi(I_n)]$ corresponding to the first subsequence and a second multidimensional feature matrix $\Phi_+=[\varphi(I_2), \varphi(I_3), \ldots, \varphi(I_j), \ldots, \varphi(I_{n+1})]$ corresponding to the second subsequence, wherein n+1 comprises a sequence length of the transmission attribute information sequence;

determine, based on the first multidimensional feature matrix and a formula $$\Re_{st} = \frac{1}{n}\Phi\Phi^T,$$

a static behavior feature matrix corresponding to the transmission attribute information sequence, wherein $\Re_{st}$ comprises the static behavior feature matrix, $\Phi^T$ comprises a transpose of the first multidimensional feature matrix, and n comprises a sequence length of the first subsequence; and determine, based on the first multidimensional feature matrix, the second multidimensional feature matrix, and a formula $\mathfrak{R}_{dn}=(\Phi_+\Phi^T)(\Phi\Phi^T+\lambda I)^{-1}$, a dynamic behavior feature matrix corresponding to the transmission attribute information sequence, wherein $\mathfrak{R}_{dn}$ comprises the dynamic behavior feature matrix, $\lambda$ comprises a regular term coefficient, and I comprises an identity matrix.

15. The server of claim 11, wherein the image classification model comprises a convolutional neural network; and the processor is further configured to:
when the feature images are input into the image classification model, further input auxiliary identification information through a fully-connected layer of the image classification model, wherein
the auxiliary identification information comprises at least one or more of the following: the packet transmission attribute information of the N consecutive packets, an Internet Protocol (IP) address of a background server corresponding to the target data stream, and a port identifier of the background server.

16. A non-transitory machine-readable medium having executable instructions to cause a processor to perform operations comprising:
obtaining packet transmission attribute information of N consecutive packets in a target data stream, wherein N comprises a positive integer greater than 1;
generating feature images of the packet transmission attribute information of the N consecutive packets based on probability distribution information of the packet transmission attribute information of the N consecutive packets; and
inputting the feature images into a pre-trained image classification model, to obtain a target application identifier corresponding to the target data stream.

17. A server comprising a memory and a processing device coupled to the memory, wherein the processing device is configured to:
obtain packet transmission attribute information of N consecutive packets in a target data stream, wherein N comprises a positive integer greater than 1;
generate feature images of the packet transmission attribute information of the N consecutive packets based on probability distribution information of the packet transmission attribute information of the N consecutive packets; and
input the feature images into a pre-trained image classification model, to obtain a target application identifier corresponding to the target data stream.

18. The server of claim 17, wherein packet transmission attribute information of each packet comprises at least one type of packet transmission attribute information; and
the processing device is further configured to:
organize a same type of packet transmission attribute information in the packet transmission attribute information of the N consecutive packets into a sequence in an order of packet arrival time, to obtain at least one type of transmission attribute information sequence;
determine a static behavior feature matrix and a dynamic behavior feature matrix that are corresponding to each type of transmission attribute information sequence in the at least one type of transmission attribute information sequence, wherein the static behavior feature matrix comprises a feature matrix used to describe a marginal probability distribution p ($I_j$) of the transmission attribute information sequence, the dynamic behavior feature matrix comprises a feature matrix used to describe a conditional probability distribution $p(I_{j+1}|I_j)$ of the transmission attribute information sequence, $I_j$ comprises packet transmission attribute information corresponding to any packet of the N consecutive packets in the transmission attribute information sequence, and $I_{j+1}$ comprises packet transmission attribute information corresponding to a next packet of the any packet in the transmission attribute information sequence;
use the static behavior feature matrix and the dynamic behavior feature matrix as the feature images of the packet transmission attribute information of the N consecutive packets;
for each transmission attribute information sequence in the at least one type of transmission attribute information sequence $\{I_1, I_2, \ldots, I_j, \ldots, I_{n+1}\}$, obtain a first subsequence $\{I_1, I_2, \ldots, I_j, \ldots, I_n\}$ and a second subsequence $\{I_2, I_3, \ldots, I_j, \ldots, I_{n+1}\}$ in the transmission attribute information sequence, and map the first subsequence and the second subsequence to multidimensional feature space by using a preset mapping function $\varphi(I_j)$, to obtain a first multidimensional feature matrix $\Phi=[\varphi(I_1), \varphi(I_2), \ldots, \varphi(I_j), \ldots, \varphi(I_n)]$ corresponding to the first subsequence and a second multidimensional feature matrix $\varphi_+[\varphi(I_2), \varphi(I_3), \ldots, \varphi(I_j), \ldots, \varphi(I_{n+1})]$ corresponding to the second subsequence, wherein n+1 comprises a sequence length of the transmission attribute information sequence;
determine, based on the first multidimensional feature matrix and a formula $$R_{st} = \frac{1}{n}\Phi\Phi^T,$$

a static behavior feature matrix corresponding to the transmission attribute information sequence, wherein $\mathfrak{R}_{st}$ comprises the static behavior feature matrix, $\Phi^T$ comprises a transpose of the first multidimensional feature matrix, and n comprises a sequence length of the first subsequence; and
determine, based on the first multidimensional feature matrix, the second multidimensional feature matrix, and a formula $\mathfrak{R}_{dn}=(\Phi_+\Phi^T)(\Phi\Phi^T+\lambda I)^{-1}$, a dynamic behavior feature matrix corresponding to the transmission attribute information sequence, wherein $\mathfrak{R}_{dn}$ comprises the dynamic behavior feature matrix, $\lambda$ comprises a regular term coefficient, and I comprises an identity matrix.

19. The non-transitory machine-readable medium of claim 16, wherein packet transmission attribute information of each packet comprises at least one type of packet transmission attribute information, and
wherein generating feature images of the packet transmission attribute information of the N consecutive packets based on the probability distribution information of the packet transmission attribute information of the N consecutive packets comprises:
organizing a same type of packet transmission attribute information in the packet transmission attribute information of the N consecutive packets into a sequence in an order of packet arrival time, to obtain at least one type of transmission attribute information sequence;
determining a static behavior feature matrix and a dynamic behavior feature matrix that are corresponding to each type of transmission attribute information sequence in the at least one type of transmission attribute information sequence, wherein the static behavior feature matrix comprises a feature matrix used to describe a marginal probability distribution $p(I_j)$ of the transmission attribute information sequence, the dynamic behavior feature matrix comprises a feature matrix used to describe a conditional probability distribution $p(I_{j+1}|I_j)$ of the transmission attribute information sequence, $I_j$ comprises packet transmission attribute information corresponding to any packet of the N consecutive packets in the transmission attribute information sequence, and $I_{j+1}$ comprises packet transmission attribute information corresponding to a next packet of the any packet in the transmission attribute information sequence; and using the static behavior feature matrix and the dynamic behavior feature matrix as the feature images of the packet transmission attribute information of the N consecutive packets.

20. The non-transitory machine-readable medium of claim 19, wherein the determining a static behavior feature matrix and a dynamic behavior feature matrix that are corresponding to each type of transmission attribute information sequence in the at least one type of transmission attribute information sequence comprises:

for each transmission attribute information sequence in the at least one type of transmission attribute information sequence $\{I_1, I_2, \ldots, I_j, \ldots, I_{n+1}\}$, obtaining a first subsequence $\{I_1, I_2, \ldots, I_j, \ldots, I_n\}$ and a second subsequence $\{I_2, I_3, \ldots, I_j, \ldots, I_{n+1}\}$ in the transmission attribute information sequence, and mapping the first subsequence and the second subsequence to multidimensional feature space by using a preset mapping function $\varphi(I_j)$, to obtain a first multidimensional feature matrix $\Phi=[\varphi(I_1), \varphi(I_2), \varphi(I_j), \ldots, \varphi(I_n)]$ corresponding to the first subsequence and a second multidimensional feature matrix $\Phi_+[\varphi(I_2), \varphi(I_3), \ldots, \varphi(I_j), \ldots, \varphi(I_{n+1})]$ corresponding to the second subsequence, wherein n+1 comprises a sequence length of the transmission attribute information sequence;

determining, based on the first multidimensional feature matrix and a formula $$R_{st} = \frac{1}{n}\Phi\Phi^T,$$

a static behavior feature matrix corresponding to the transmission attribute information sequence, wherein $\Re_{st}$ comprises the static behavior feature matrix, $\Phi^T$ comprises a transpose of the first multidimensional feature matrix, and n comprises a sequence length of the first subsequence; and determining, based on the first multidimensional feature matrix, the second multidimensional feature matrix, and a formula $\Re_{dn}=(\Phi_+\Phi^T)(\Phi\Phi^T+\lambda I)^{-1}$, a dynamic behavior feature matrix corresponding to the transmission attribute information sequence, wherein $\Re_{dn}$ comprises the dynamic behavior feature matrix, $\lambda$ comprises a regular term coefficient, and I comprises an identity matrix.

* * * * *